United States Patent [19]
Wagner

[11] 3,710,704
[45] Jan. 16, 1973

[54] ILLUMINATING ARRANGEMENT WITH FLASH LAMPS FOR USE WITH PHOTOGRAPHIC APPARATUS

[75] Inventor: Karl Wagner, Ottobrunn, Germany

[73] Assignee: Agfa-Gevaert Aktiengesellschaft, Leverkusen, Germany

[22] Filed: Jan. 12, 1971

[21] Appl. No.: 105,826

[30] Foreign Application Priority Data

Jan. 16, 1970 Germany..................P 20 01 798.5

[52] U.S. Cl. ...............................................95/11 L
[51] Int. Cl...............................................G03b 17/56
[58] Field of Search...............95/11 R, 11 L, 11.5 R; 240/1.3; 431/93, 95

[56] References Cited

UNITED STATES PATENTS

| | | | |
|---|---|---|---|
| 3,497,863 | 2/1970 | Horton et al.................. | 95/11.5 R X |
| 3,380,357 | 4/1968 | Harvey............................ | 95/11.5 R |
| 3,267,272 | 8/1966 | Fischer............................ | 240/1.3 |
| 2,972,937 | 2/1961 | Suits................................. | 95/11.5 R |
| 3,430,546 | 3/1969 | Holt................................. | 95/11.5 R |

FOREIGN PATENTS OR APPLICATIONS 6,616,822 2/1967 Netherlands.....................95/11 L

*Primary Examiner*—Samuel S. Matthews
*Assistant Examiner*—Fred L. Braun
*Attorney*—Michael S. Striker

[57] ABSTRACT

An illuminating arrangement having a flash circuit which is built into the body of a camera and utilizing flashcubes whose bases can be inserted into a socket of the camera body. The flash circuit has two contacts which are engaged by the electrodes of a selected flash lamp of that flashcube which is connected with the camera body. An arcuate elastic metallic element short-circuits the electrodes of all such flash lamps which are not in proper position for illumination of a subject or scene. The flash circuit has a normally open synchronizing switch in series with the two contacts and with a source of high voltage, such as a battery and a capacitor connected with a transformer or a piezoelectric crystal which can be struck by an impeller on closing of the switch to induce a voltage which is high enough to fire that flash lamp whose electrodes are connected with the contacts of the flash circuit.

6 Claims, 4 Drawing Figures

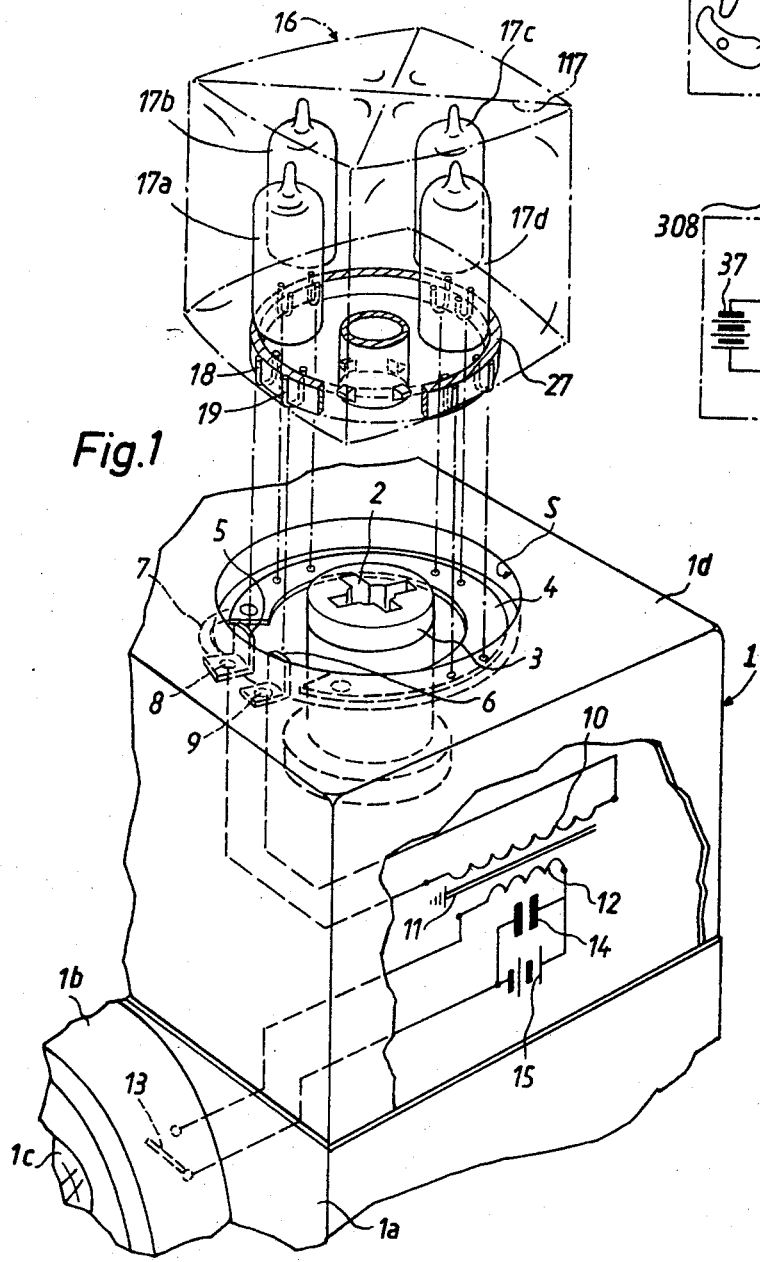
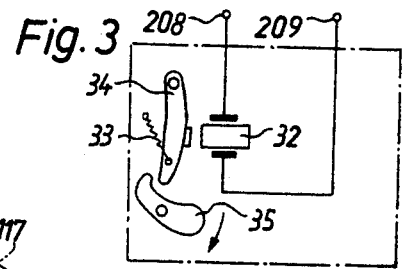
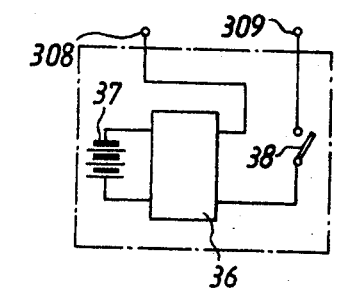

ILLUMINATING ARRANGEMENT WITH FLASH LAMPS FOR USE WITH PHOTOGRAPHIC APPARATUS

BACKGROUND OF THE INVENTION

The present invention relates to illuminating arrangements for use in or with photographic apparatus. More particularly, the invention relates to improvements in illuminating arrangements of the type wherein a holder having two or more flash lamps is movable with reference to the contacts of a flash circuit to place selected lamps into proper position for firing. Still more particularly, the invention relates to improvements in illuminating arrangements of the type which preferably employ manually or otherwise indexible flashcubes or analogous holders for flash lamps having pairs of electrodes which are connected in the flash circuit prior to completion of the circuit by a synchronizing switch or the like.

A drawback of presently known illuminating arrangements which utilize flashcubes or analogous holders for two or more flash lamps is that the plastic housings of such holders tend to accumulate electrostatic charges which can generate voltages high enough to cause undesirable (i.e., untimely) firing of flash lamps. The likelihood of untimely firing is even more pronounced in view of the fact that a flash lamp of the type normally used in a flashcube and having two electrodes exhibits a relatively high internal resistance. Therefore, the electrostatic charges suffice to generate such voltages which are needed for the firing of lamps.

SUMMARY OF THE INVENTION

An object of the invention is to provide an illuminating arrangement which utilizes holders for two or more flash lamps of the type having two electrodes and exhibiting a relatively high internal resistance with means for preventing untimely firing of that lamp or of those lamps which are not in proper position for illumination of a subject or scene.

Another object of the invention is to provide an illuminating arrangement for use with or in photographic apparatus with novel means for insuring that only one of two or more lamps can be fired at a particular time, for example, in automatic response to actuation of the camera release element.

A further object of the invention is to provide the flash circuit for use with flashcubes or analogous flash lamp holders with simple, compact, inexpensive and reliable means for preventing untimely firing of more than one flash lamp at a time.

An additional object of the invention is to provide a photographic apparatus having a socket or an analogous receptacle for flashcubes or similar flash lamp holders with novel, compact and reliable means for preventing firing of that lamp or of those lamps which are not located in an optimum position for illumination of a subject or scene.

The invention is embodied in an illuminating arrangement which is particularly suited for use in or with photographic apparatus and comprises a flash circuit having a pair of contacts preferably in series with a suitable source of high voltage and with a synchronizing switch, a holder including at least two but normally four flash lamps each having two electrodes, the holder being movable (preferably rotatable) with reference to the flash circuit between a plurality of positions in each of which the contacts of the flash circuit are engaged by the electrodes of a different flash lamp so that a selected lamp whose electrodes engage the contacts can be fired in response to completion of the flash circuit (for example, by the aforementioned synchronizing switch which can be actuated simultaneously with opening of the shutter in a camera), and short-circuiting means for the electrodes of each other lamp of the holder, i.e., for each of those lamps which are not in proper position for illumination of a subject or scene.

The short-circuiting means preferably comprises at least one elastic segmental or arcuate element consisting of current-conducting metallic material and directly or indirectly contacting both electrodes of each but the selected flash lamp in the holder. The current-conducting element can be connected to one contact of the flash circuit by a conductor in the form of a wire or in the form of a post engaging a centrally located current-conducting coupling portion of the holder.

The novel features which are considered as characteristic of the invention are set forth in particular in the appended claims. The improved illuminating arrangement itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a perspective view of an illuminating arrangement which embodies one form of the invention and has a flash circuit which is built into a photographic apparatus, the holder for flash lamps being shown in a position it assumes prior to insertion into a socket in the body of the photographic apparatus;

FIG. 3 illustrates the flash circuit of a third illuminating arrangement; and

FIG. 4 illustrates the flash circuit of a fourth illuminating arrangement.

DESCRIPTION OF THE PREFERRED EMBODIMENTS

Figure 2:
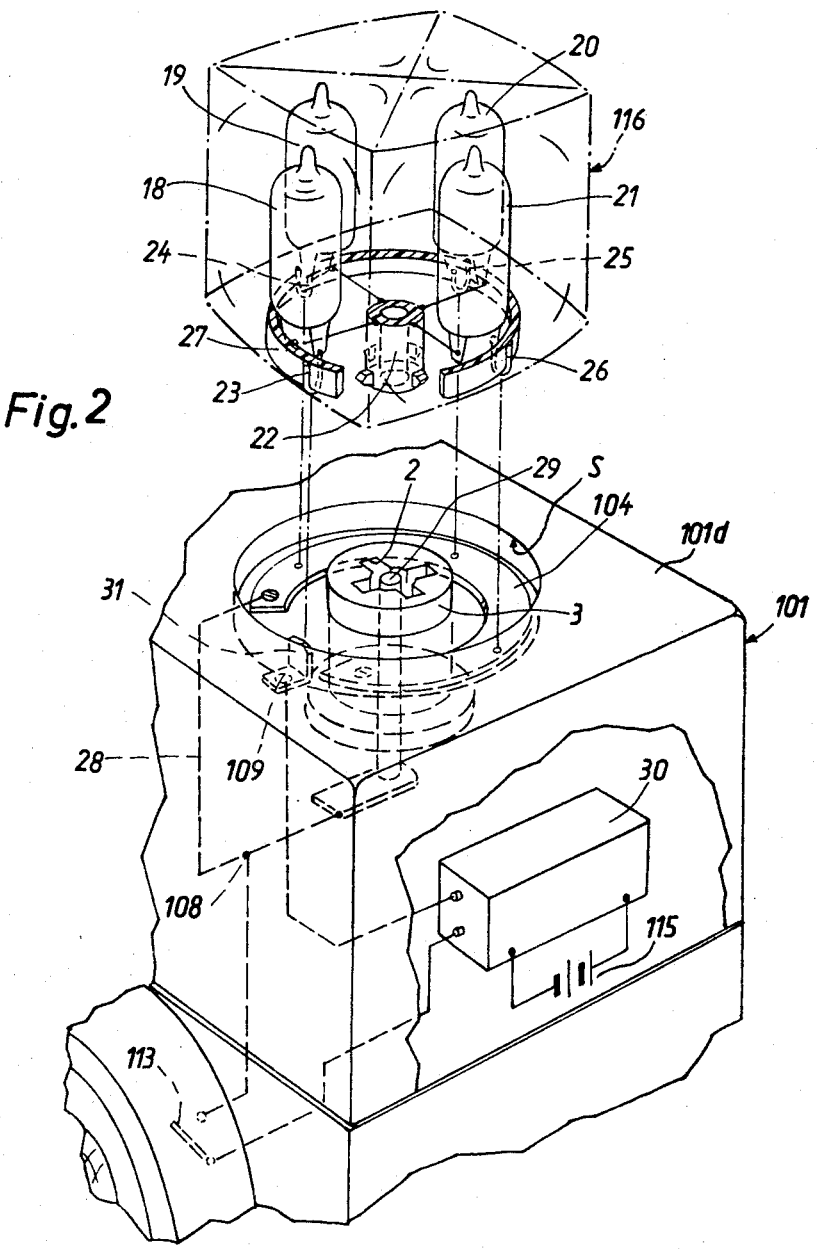
FIG. 2 is a perspective view of a second illuminating arrangement which utilizes modified holders for flash lamps.

Referring first to FIG. 1, there is shown a portion of a photographic apparatus which comprises a body or housing 1 having a front wall 1a supporting a mount 1b for a picture taking lens 1c, and a top wall 1d provided with a receptacle or socket S for a lamp holder 16 of the type known as flashcube. The socket S surrounds a cylindrical hub 3 having in its top face a cruciform recess 2 for reception of a foot (not shown) of the flashcube 16. The latter is of customary design, i.e., it has four equidistant flash lamps 17a, 17b, 17c, 17d each located in front of a suitable reflector 117 and each having two electrodes including terminals 18, 19 which are bent around a ring-shaped base 27 consisting of insulating material. Due to their high internal resistance, the lamps 17a–17d can be fired in response to the application of medium high or high potential to the respective terminals 18, 19.

The flash circuit which is installed in the body 1 of the photographic apparatus includes a source of high voltage here shown as comprising a battery or an analogous energy source 15 connected in series with the primary winding 12 of a transformer 11 and in parallel with a capacitor 14. The secondary winding 10 of the transformer 11 is connected with two contacts 8, 9 which are accessible in the socket S. The flash circuit is completed in response to closing of its synchronizing switch 13; such closing can take place in automatic response to opening of the shutter, not shown.

The contacts 8, 9 are provided on current-conducting members 5, 6 which are mounted in the housing 1 so as to be engaged by the terminals 18, 19 of electrodes in that flash lamp (17a in FIG. 1) which faces the subject or scene when the flashcube 16 is properly attached to the housing 1. In accordance with a feature of the invention, the housing 1 further contains an arcuate short-circuiting element 4 which is mounted in the socket S in such a way that it contacts the terminals of electrodes in the flash lamps 17b–17c, i.e., in those flash lamps which are not in the firing position. The element 4 consists of preferably resilient current-conducting material and is connected to the member 5 and hence to the contact 8 by a conductor 7.

When the flashcube 16 is properly attached to the housing 1, the flash lamp 17a is assumed to face the subject or scene and the terminals 18, 19 of the electrodes in the lamp 17a engage the contacts 8, 9 so that they are properly connected in the flash circuit. When the synchronizing switch 13 is closed, the capacitor 14 discharges through the primary 12 of the transformer 11 to thereby induce in the secondary 10 a high voltage which is sufficient to fire the flash lamp 17a at the time when the shutter is open. Accidental firing of the flash lamps 17b–17c is prevented by the short-circuiting element 4. The flashcube 16 is thereupon turned through 90° or through a multiple of 90° to place one of the flash lamps 17b–17d into the firing position. The element 4 then prevents accidental firing of the remaining two unfired flash lamps, and so on until the next-to-the-last of the four lamps is fired. The flashcube 16 can be indexed by hand, in automatic response to the making of an exposure, or in automatic response to transport of the film.

The short-circuiting element 4 or an analogous element can be used with equal advantage in photographic apparatus which are designed to utilize other types of holders for two or more flash lamps. Also, the flash circuit can employ other means for generating the voltage which is needed to fire a flash lamp. The element 4 can be said to form part of the socket S and can serve to properly locate and/or mechanically support and hold the holder 16 in inserted position. Its resiliency enables the element 4 to engage both electrodes of three lamps in a properly inserted holder.

FIG. 2 illustrates a portion of a second camera having a housing or body 101 whose top wall 101d is provided with a receptacle or socket S surrounding a cylindrical hub 3 with a cruciform recess 2. The holder 116 is a flashcube having four equidistant flash lamps 18, 19, 20, 21 each of which is provided with two electrodes. One electrode of each lamp is connected with a centrally located female coupling element or sleeve 22. At least that portion of the sleeve 22 which is adjacent to its internal surface consists of current-conducting material and is connected with one electrode of each of the lamps 18–21. The second electrodes of the lamps 18–21 are respectively shown at 23, 24, 25 and 26; these electrodes are connected to a ring 27 consisting of insulating material and being receivable in the socket S.

The body 101 of the camera further accommodates an arcuate elastic short-circuiting element 104 which is connected with a current-conducting male coupling member, here shown as a post or pin 29, by way of a conductor 28. The pin 29 is concentric with the socket S and is received in and makes contact with the current-conducting portion of the sleeve 22 when the flashcube 116 is properly attached to the camera body 101. The numeral 31 denotes a current-conducting member provided with a contact 109 corresponding to the contact 9 of FIG. 1. The source of high voltage of the flash circuit in the camera body 101 is shown at 30, its energy source at 115 and the synchronizing switch at 113. The source 30 can be constructed in the same way as shown in FIG. 1; i.e., it can comprise a capacitor in parallel with the energy source 115 and a transformer whose primary winding is in series with the energy source 115 and synchronizing switch 113 and whose secondary winding is connected to the pin 29 and contact 109. The contact 108 of FIG. 2 corresponds to the contact 8 of FIG. 1.

When the flashcube 116 is properly attached to the camera body 101, the flash lamp 18 is assumed to face the subject so the that terminal 23 of one of its electrodes engages the contact 109. The other electrode of the flash lamp 18 is connected with the contact 108 by way of the current-conducting portion of the sleeve 22 and pin 29. The terminals 24–26 of the lamps 19–21 are connected to the short-circuiting element 104. Thus, the lamps 19–21 are short-circuited by way of the conductor 28, pin 29 and sleeve 22. The lamp 18 is fired in response to closing of the synchronizing switch 113. The holder 116 is thereupon indexed to place one of the lamps 19–21 into requisite position for firing.

FIG. 3 illustrates the flash circuit of a third photographic apparatus wherein the source of high voltage comprises a piezoelectric crystal 32 and an impeller 34 which is biased by a spring 33 and can be released from a cocked position (shown in FIG. 3) in response to pivoting of a release lever 35 to strike against the crystal 32 and to thereby induce a high voltage which is sufficient to fire a flash lamp (not shown) whose terminals are connected to the contacts 208, 209.

FIG. 4 shows a further flash circuit which includes a source 37 of DC current, contacts 308, 309, a synchronizing switch 38, and a conventional high-voltage generator 36. The latter serves to amplify the voltage furnished by the energy source 37 so that a flash lamp whose terminals are connected to the contacts 308, 309 is fired in response to closing of the synchronizing switch 38. The flash circuits shown in FIGS. 3 and 4 can be used in the camera of FIG. 1 or 2.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. An illuminating arrangement, particularly for use with photographic apparatus, comprising a flash circuit having a pair of contacts; a holder including at least two flash lamps each having a high internal resistance and two electrodes, said holder being movable with reference to said flash circuit between a plurality of positions in each of which said contacts are engaged by the electrodes of a different flash lamp so that a selected lamp whose electrodes engage said contacts can be fired in response to completion of said circuit, one electrode of each of said lamps being connected to one of said contacts in each position of said holder; and short-circuiting means for the electrodes of each flash lamp other than said selected lamp, said short-circuiting means comprising an arcuate metallic element connecting said one contact with the other electrode of each flash lamp other than said selected flash lamp.

2. An arrangement as defined in claim 1, wherein said holder is rotatable between said plurality of positions.

3. An arrangement as defined in claim 1, further comprising a socket for said holder, said short-circuiting means being installed in said socket.

4. An arrangement as defined in claim 3, wherein said socket is provided in the body of a camera.

5. An arrangement as defined in claim 1, wherein said flash circuit includes a source of high potential which is in series with the electrodes of said selected lamp.

6. An illuminating arrangement, particularly for use with photographic apparatus, comprising a flash circuit having a pair of contacts; a holder including at least two flash lamps each having two electrodes, said holder being rotable with reference to said flash circuit between a plurality of positions in each of which said contacts are engaged by the electrodes of a different flash lamp so that a selected flash lamp whose electrodes engage said contacts can be fired in response to completion of said circuit, one electrode of each of said lamps being connected to one of said contacts in each position of said holder and said holder further comprising an axially extending first coupling portion consisting at least in part of current-conducting material and electrically connected with said one electrode of each of said flash lamps, said circuit including a complementary second coupling portion consisting at least in part of current-conducting material and electrically connected with said one contact, said coupling portions being in current-conducting engagement with each other but being separable to permit disconnection of said holder from said circuit; and short-circuiting means for the electrodes of each flash lamp other than said selected lamp, said short-circuiting means comprising an arcuate metallic element connecting said one contact with the other electrode of each flash lamp other than said selected flash lamp.

* * * * *